Sept. 25, 1928. 1,685,310
E. P. BURRELL ET AL
CONTROLLING LEVER FOR MACHINE TOOLS
Filed Nov. 3, 1926 2 Sheets-Sheet 1
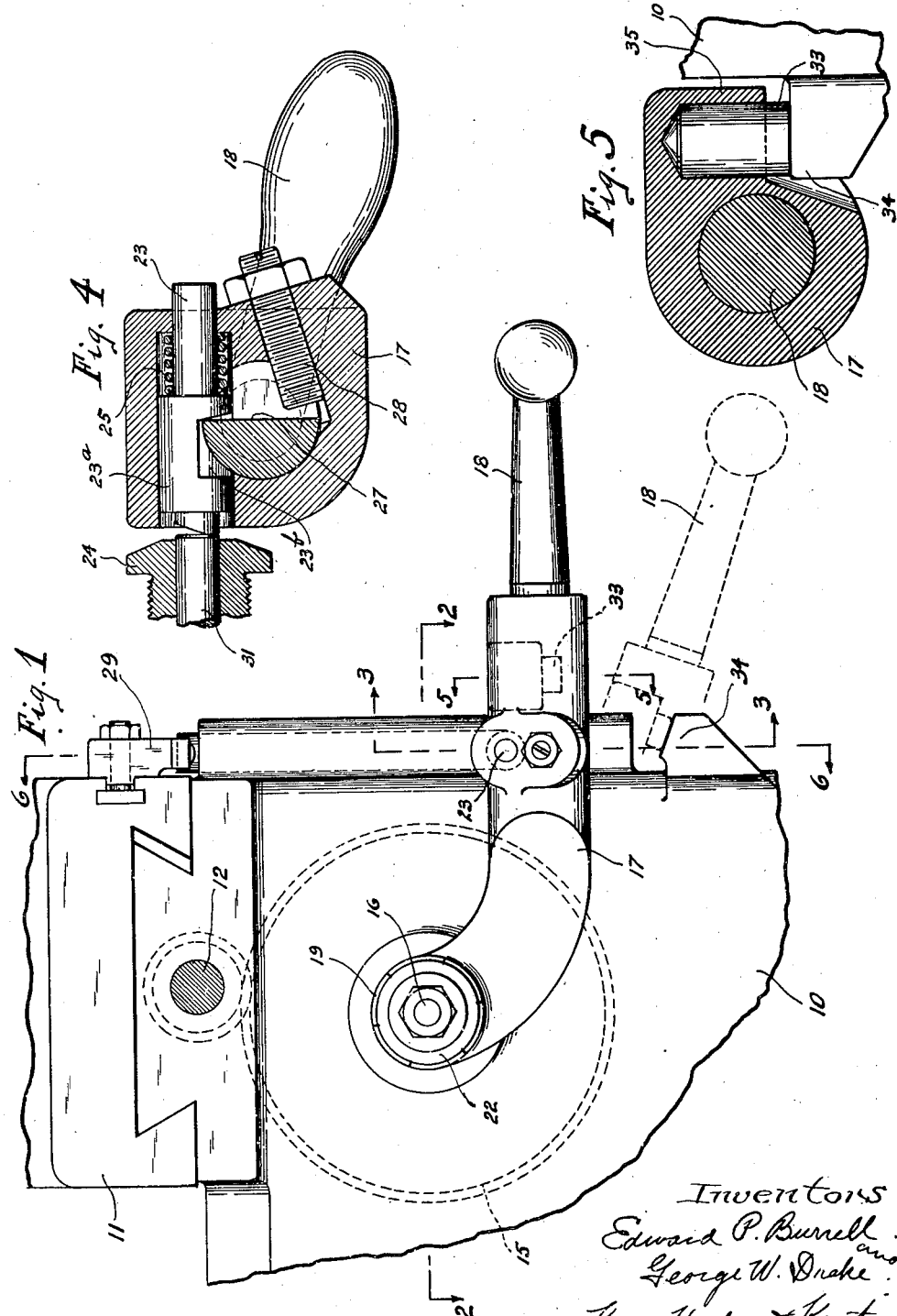

Sept. 25, 1928. 1,685,310
E. P. BURRELL ET AL
CONTROLLING LEVER FOR MACHINE TOOLS
Filed Nov. 3, 1926 2 Sheets-Sheet 2
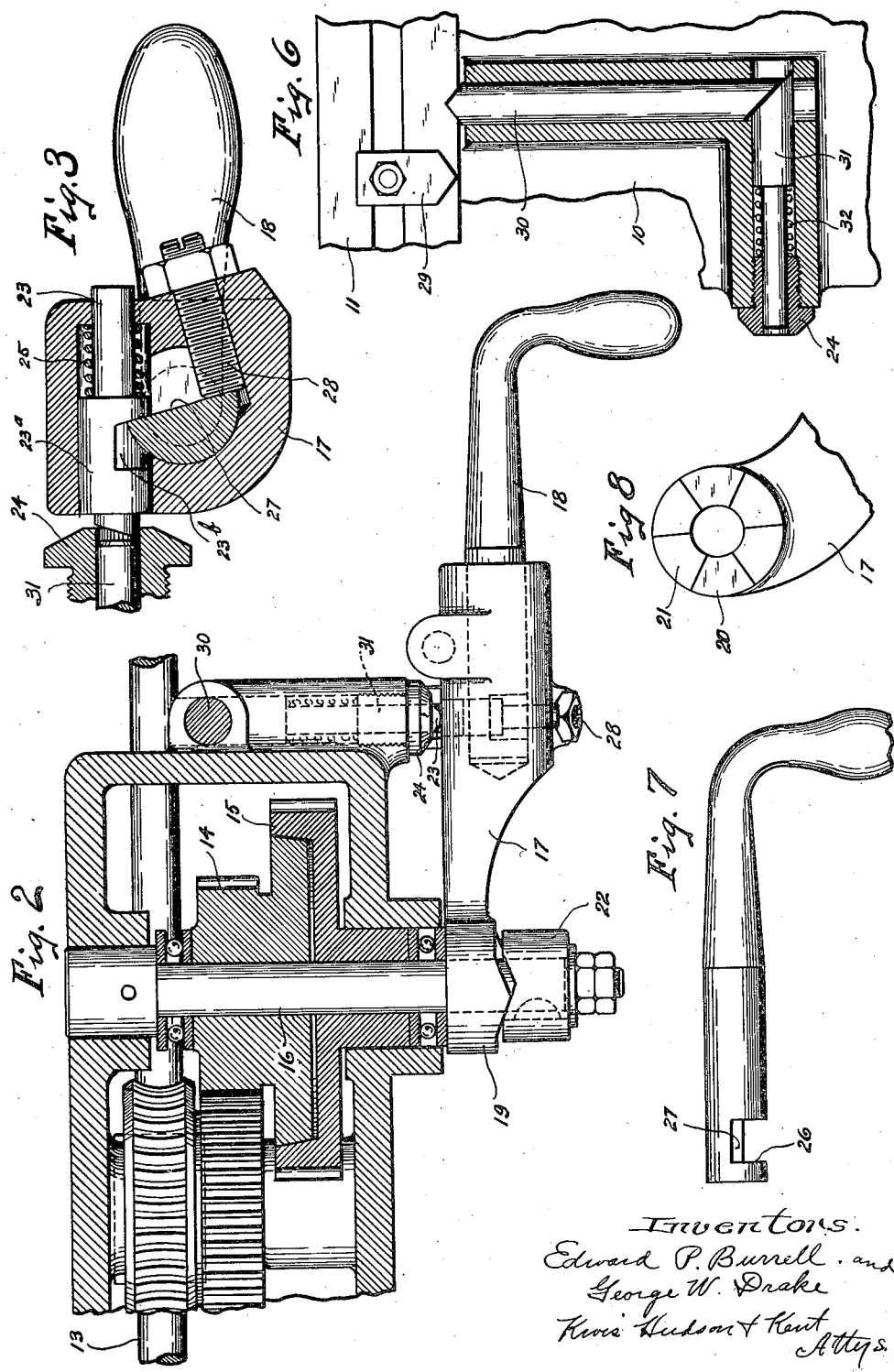

Patented Sept. 25, 1928.

1,685,310

UNITED STATES PATENT OFFICE.

EDWARD P. BURRELL, OF SHAKER HEIGHTS, AND GEORGE W. DRAKE, OF CLEVELAND HEIGHTS, OHIO, ASSIGNORS TO THE WARNER AND SWASEY COMPANY, OF CLEVELAND, OHIO, A CORPORATION OF OHIO.

CONTROLLING LEVER FOR MACHINE TOOLS.

Application filed November 3, 1926. Serial No. 145,991.

This invention relates to a controlling lever for machine tools and has for its chief object to provide a lever which can be more easily and conveniently operated, especially under certain conditions of pressure on the cutting tool than the levers heretofore used for a like purpose.

In certain types of machine tools, it is customary to control the movement of a movable member, such as the cross slide carriage, the cross slide, or turret saddle by means of a lever which when moved to operating position causes the engagement of a clutch. In order that the clutch may be held in engaged position until the desired movement of the member is completed, it is customary to provide on the lever a holding or locking pin which engages in a suitable cooperating recess on the apron or other part of the machine tool associated with the lever, since the tendency of the clutch, due to the pressure of the work on the tool, is to become disengaged and to throw the lever from its operative to its inoperative position. Under certain conditions, as when a deep or heavy cut is being taken, with the result that the work exerts considerable pressure on the cutting tool, it is not an easy matter to release the locking pin so as to permit the clutch to be disengaged, and it is often necessary for the operator to use both hands to release the lever, one hand being required to lift up or otherwise shift the lever to release the pressure on the locking pin, and the other being required to pull out the locking pin so that the lever can swing back to its normal or inoperative position while the clutch is disengaging.

By the new lever construction constituting the subject matter of this invention, the release of the lever can at all times be accomplished easily and quickly, and in no case requires the use of more than one hand of the operator.

The invention may be briefly summarized as consisting in certain novel details of construction and combinations and arrangements of parts which will be described in the specification and set forth in the appended claims.

In the accompanying sheets of drawings illustrating the preferred embodiment of our invention, Fig. 1 is a face view or side elevation, partly in section, of a portion of a machine tool equipped with our improved lever; Fig. 2 is a horizontal sectional view substantially along the line 2—2 of Fig. 1; Fig. 3 is a sectional view substantially along the line 3—3 of Fig. 1, this view showing the two parts of the lever in the relative positions which they occupy when the clutch controlled by the lever is engaged and when the lever is held in this position, which may be termed the operative position by the locking pin; Fig. 4 is a similar view showing the relative positions of the parts of the lever when the handle portion of the lever is swung to release the locking pin; Fig. 5 is a fragmentary sectional view substantially along the line 5—5 of Fig. 1; Fig. 6 is a sectional view substantially along the line 6—6 of Fig. 1, omitting the lever; Fig. 7 is an elevation of the outer or handle member of the lever; and Fig. 8 is a face view of the hub portion of the inner part of the lever showing the cam faces provided thereon to cooperate with other cam faces of an associated part to bring about the engagement and disengagement of the clutch when the lever is shifted.

Our improved lever may be employed on various types of machine tools, such as engine lathes, turret lathes, and the like, and it may be employed advantageously for controlling the movement of different parts of a machine tool, as, for example, the cross slide carriage, turret saddle, and the cross slide on the cross slide carriage. Inasmuch as the invention resides in the improved lever and in its application to any suitable part of a machine tool where its use is desirable for the purposes above outlined, we have not deemed it necessary to show any considerable portion of a machine tool nor all the different movable members thereof to which the lever may be applied. Accordingly, in the drawings we have illustrated at 10 a portion of the apron of a cross slide carriage which is adapted to travel along the ways of the bed of the machine tool, and at the top of the apron we have illustrated a part 11 which represents the cross slide itself, the lever in this instance being adapted to control the movement of the cross slide on the carriage of which the apron 10 is a part. Generally, the cross slide is moved by a screw 12 which is actuated by a lead screw 13 through suitable gears and through the medium of a clutch here shown as composed of two parts 14 and 15 mounted coaxially on a bearing pin 16 (see Fig. 2). When the clutch is engaged, a driving connection is established between the lead screw 13 and the cross feed screw 12, and when the clutch is disengaged the driving connection is broken. It is customary to control the clutch by a lever mounted on the bearing pin 16, this lever, through the medium of cam faces cooperating with stationary cam faces, serving to draw the two parts of the clutch together into driving engagement. The lever next to be described is adapted for this purpose and for similar purposes on other parts of various kinds of machine tools.

Taking up now the construction of the lever, it will be observed that it is composed of an inner part 17 and an outer or handle part 18 which is rotatably fitted into a suitable socket formed in the inner part 17 so that it may turn relative to the latter about an axis which is at right angles to the axis about which the lever as a whole turns.

The inner part 17 of the lever is provided with a hub portion 19 fitted on the bearing pin 16 and having on its outer face flat portions 20 and cam faces 21 adapted to cooperate with cooperating cam faces of a collar 22 adjustably mounted on the outer end of the bearing pin 16 and held from rotation thereon. In Fig. 2 the lever is in a position corresponding to the engaged position of the clutch, this position of the lever being the substantially horizontal position indicated in Fig. 1, and, when the lever swings downward from the position illustrated, the clutch is disengaged.

The inner part 17 of the lever is further provided with a catch or locking member, preferably in the form of a transversely movable pin 23 which at its inner end is designed to engage with a suitable recess provided on the part of the machine tool along the face of which the lever is adapted to swing so as to hold the lever in its operative position with the clutch engaged. In this instance this recess is formed in a bushing 24 carried by the apron 10, the locking pin being normally moved or urged inwardly toward the bushing by a spring 25. Additionally, it will be observed that the pin 23 has an enlarged body portion 23ª on the under side of which there is a notch 23ᵇ.

The bore or socket of the inner handle part 17 which receives the end of the outer or handle part 18 intersects the opening or socket formed in the inner handle part 17 to receive the locking pin 23, as will be observed by reference to Figs. 3 and 4. At the point where this intersection occurs the inner end or end portion of the outer handle part 18 is provided with a transverse notch 26 which is substantially semi-circular in extent and the base of which is formed by a flat face 27.

A portion of the inner handle member reduced by the notch 26 projects up into the notch 23ᵇ of the locking pin, as clearly illustrated in Figs. 3 and 4, so that it is possible for the rotation of the outer handle part 18 relative to the inner handle part 17 to shift the locking pin in an endwise direction. Additionally, as will be observed by reference to Figs. 3 and 4, the inner handle part 17 is provided in line with the notch 26 formed in the outer handle part, as described, with a set screw 28 the end of which projects into the notch 26, and when the free end of the outer part 18 of the lever is in its normal or horizontal position, as indicated in Fig. 3, the inner end of this set screw engages the flat face 27 of the notch. Thus the end of the screw and the flat face forming the base of the notch constitute two abutting parts arranged so that the screw forms a positive stop to limit the swinging movement of the outer handle part relative to the inner part of the lever. The set screw 28 is adjustable so that it is possible to vary the point at which the upward swinging movement is arrested, thus making it possible to always bring the outer end of the handle part of the lever to a substantially horizontal position when the outer part is in its usual or normal position relative to the inner part. The adjustability of this set screw also makes it possible to vary the distance that the active portion or nose of the locking pin 23 projects beyond the inner face of the lever, this being apparent from consideration of Fig. 3.

It will be observed by a comparison of Fig. 3 with Fig. 4 that when the outer end of the handle part 18 of the lever is swung downward from horizontal position to disengage the locking pin from the bushing 24, the spring 25 behind the locking pin is compressed, and, accordingly, as soon as the operator takes his hand from the handle portion of the lever after the lever as a whole has been swung downward, the spring 25 will again immediately turn the handle portion 18 of the lever back to its normal position indicated in Fig. 3, with the nose of the locking pin projecting inwardly beyond the inner face of the lever.

The operation of this lever with its associated parts is as follows:

As already stated, when the clutch is disengaged, the laterally extended or free end of the handle part of the lever projects outwardly in a substantially horizontal direction, the lever as a whole being swung downwardly to substantially the position shown by dotted lines in Fig. 1, it being understood that the clutch, composed in this instance of the parts 14 and 15, is disengaged. To engage the clutch, the operator simply pulls up on the lever for at this time the flat face 27 at the notched part of the outer handle member 18 is in engagement with the inner end of the set screw 28 so that the effect of pulling up on the outer or free end of the handle part of the lever is to swing the lever as a whole about the bearing pin 16 so as to cause the engagement of the clutch. This upward movement is continued until the inner end of the locking pin 23 snaps into the recess in the bushing 24, the outer end of the bushing and the inner end of the locking pin both being preferably beveled so that the inner projecting end of the locking pin can readily ride up onto the face of the bushing and snap into the recess provided for it in the bushing. The spring 25 is compressed when the end of the locking pin rides up on the beveled face of the bushing, and, accordingly, the spring will cause the pin to snap into the recess as soon as the pin comes in alignment with the recess. As the end of the pin snaps into the recess, its inward movement is arrested by the flat face 27, the position of which, determined by the adjustment of the set screw as above stated, fixing the distance that the locking pin may enter the recess of the bushing.

The clutch may be disengaged either manually or automatically. In Figs. 1 and 6 we have shown a customary way in which the clutch may be disengaged automatically, this comprising a dog 29 adjustably secured to the side of the slide 11 and adapted to engage the upper end of a vertically movable pin 30 slidably mounted in a vertical socket in one of the walls of the apron 10, the lower end of this pin being adapted to engage the inner end of a horizontally disposed pin 31 which pin moves in a socket disposed horizontally in the apron in line with the opening formed in the bushing 24, both ends of the vertical pin 30 and the inner end of the horizontal pin 31 being beveled so that the dog may cam the pin 30 downward and the downward movement of the pin 30 will cam the horizontal pin 31 forward against the action of a spring 32 acting on pin 31. This forward movement of the pin 31 causes the locking pin 23 to be moved outward free of the socket or opening formed in the bushing 24, so that the clutch may automatically disengage itself at a time determined by the position of the dog 29 on the slide 11, and when the clutch is disengaged in this manner, gravity assisted by the action of the cam faces 21 on the inner end of the lever on the correspondingly tapered faces of the collar 22 causes the lever as a whole to swing downward to its normal or inoperative position, shown by dotted lines in Fig. 1.

There is preferably provided on the inner side of the inner part of the lever a rubber bumper 33 which is adapted to engage an appropriately positioned shoulder 34 formed on the apron (see Figs. 1 and 5), the function of this bumper and shoulder being to yieldingly and quitely stop the downward swinging movement of the lever and to prevent breaking of the lever due to the repeated blows received on lowering. The bumper 33 is fitted into a socket formed in an extension 35 of the inner part of the lever just beyond the part thereof which accommodates the locking pin.

In case the operator desires to disengage the clutch manually, all that it is necessary for him to do is to press down on the laterally projecting outer end of the handle part 18 of the lever. Since the locking pin is in engagement with the socket in the bushing 24, the effect of this is to turn the handle part 18 of the lever relative to the inner part 17 of the lever. This swings the flat face or base 27 away from the inner end of the set screw 28 and retracts the locking pin or moves it from the position shown in Fig. 3 to the position shown in Fig. 4 until the inner end of the locking pin is clear of the bushing 24, whereupon gravity and the action of the clutch swings the lever as a whole downwardly until the bumper 33 engages the shoulder 34.

It will be seen that whereas heretofore it was necessary for the operator to grasp the outer end of the locking pin and manually pull it outward under the pressure of the work on the cutting tool which, as already stated, would at times make it almost impossible for the operator to retract the locking pin unless the lever were swung upwardly so as to release the pressure between said locking pin and the bushing with our improved lever the withdrawal of the locking pin is rendered very easy because of the leverage provided by the laterally extended free end of the handle portion 18 of the lever. In practice, the ratio of the length of this laterally extended end of the handle portion 18 to the radius of the part thereof which is rotatably fitted in the inner part 17 of the lever is so great that the locking pin can be withdrawn by the application of only a slight pressure on the outer free end of the handle portion 18 of the lever. Not only does this construction render it very easy for the operator to withdraw the locking pin but it will be observed that the direction in which the pressure is applied to accomplish this is in the same direction that the lever as a whole swings in the releasing operation, and, accordingly, in practice it is only necessary for the operator to tap the outer end of the handle portion 18 to bring about the retraction of the locking pin and the downward swinging movement of the lever to release the clutch.

The construction which we have provided is not only efficient but is readily assembled. It will be observed that to assemble the parts it is only necessary to insert the locking pin in the socket provided for it, then insert the end of the handle portion 18 of the lever in the socket provided for it in the inner part 17 of the lever, insert the set screw and adjust it to the desired position, and inasmuch as the inner end of the set screw is in the notched part 26 of the inner end of the handle portion 18, the latter is prevented from being pulled out by endwise movement until the set screw is removed.

While we have shown the preferred construction, we do not desire to be confined to the precise details illustrated, but aim in our claims to cover all modifications which do not involve a departure from the spirit and scope of our invention.

Having thus described our invention, we claim:

1. A controlling lever for a machine tool comprising an inner part and an outer part, the inner part having a transversely movable locking member and the outer part being rotatably supported by the inner part to turn about an axis lengthwise of the inner part and having a portion which actuates the locking member when turned in one direction relative to the inner part.

2. A controlling lever for a machine tool comprising an inner part adapted to be turned about an axis and an outer part rotatably supported by the inner part so as to turn about an axis at right angles to the first named axis and lengthwise of the inner part, the inner part carrying a locking member projecting laterally beyond such part and movable transversely thereof and the outer part having a portion for shifting the locking member when the outer part is turned in one direction relative to the inner part.

3. A controlling lever for a machine tool comprising an inner actuating part and an outer handle part rotatably supported by the former, said parts having portions which abut so as to form a rigid connection when the handle part is swung in one direction, and the actuating part having a locking or holding pin which projects laterally from and beyond the lever and which is actuated by the handle part when the latter is swung in the opposite direction.

4. A controlling lever for a machine tool comprising an inner actuating part carrying a transversely extending locking member having an operative end projecting laterally outward for engaging a portion of the machine tool adjacent the handle, and said lever further comprising an outer handle part rotatably supported by the inner part, said parts of the lever having portions which abut so as to form a rigid connection when the handle part is swung in one direction and the actuating part having a portion which shifts said locking member when the handle part is swung in the opposite direction.

5. A controlling lever for a machine tool comprising inner and outer relatively movable parts, said parts having portions which abut to form a rigid connection when the lever as a whole is turned about its axis and said outer part having a laterally projecting handle portion and having another portion journalled in the inner part to turn about an axis in the plane of movement of the lever about said axis, and a member having one end extending laterally beyond the lever and adapted to be shifted when the handle portion is swung relative to the inner part of the lever.

6. A controlling lever for a machine tool comprising inner and outer relatively movable parts, the outer part having a handle, said parts of the lever having abutting portions which form a rigid connection when the outer part is swung in one direction whereby the lever as a whole is turned about the axis of the inner part, and the inner part having a locking pin which has a portion projecting laterally beyond the lever and which is actuated when the outer part is swung in the opposite direction, said outer part then moving relative to the inner part.

7. A controlling lever for a machine tool comprising an inner part and an outer part having a handle, said parts having portions which engage so as to form a rigid connection when the handle is swung in one direction and said outer part being rotatably supported on the inner part so that when the handle is swung in the opposite direction said outer part will move about an axis at right angles to the axis of movement of the lever as a whole, and said inner part having a locking member which is actuated so as to release the lever when said handle is swung in said last mentioned direction.

8. In combination with a machine tool having a movable part, an operating mechanism therefor, of a controlling lever for said operating mechanism which lever when swung in one direction causes engagement of certain parts of said operating mechanism and when swung in the opposite direction releases said parts, a locking pin having a portion projecting laterally of the lever for holding the lever with said parts engaged, said lever composed of parts which are relatively movable, one of said parts moving relative to the other and shifting the locking pin so as to release the lever when the lever is shifted in a releasing direction.

9. In combination with a machine tool having a movable member, an operating mechanism therefor, of a controlling lever for said operating mechanism and serving when shifted in one direction to cause certain parts of said operating mechanism to engage and when shifted in the opposite direction causing them to disengage, of a locking member having a portion projecting laterally of the lever for holding the lever in position with the said parts engaged, said lever having an outer handle portion which is movable relative to the inner portion of the lever and which when shifted in a direction to disengage said parts of the operating mechanism first moves relative to the inner part so as to release the lever and thereby permit the lever as a whole to move.

10. In combination with a machine tool having movable parts, an operating mechanism therefor, of a controlling lever which when shifted in one direction causes certain parts of said mechanism to engage and when shifted in the opposite direction causes the said parts to disengage, said lever comprising an inner pivoted part, an outer relatively movable handle part rotatably supported by the inner part to swing about an axis at right angles to the axis of movement of the inner part, said handle part when moved in a direction to engage said parts of the operating mechanism being rigidly connected to the inner part and when moved in a direction to disengage said parts first having a movement about its own axis and then moving with the inner part about the axis of movement of the latter, and a locking member carried by the inner part of the lever and adapted to engage an appropriate part of the machine tool to hold the lever in position with said parts of the mechanism engaged, said handle portion of the lever serving to move said locking member to releasing position when the handle portion is moved relative to the inner part of the lever.

11. A lever for a machine tool comprising an inner part and an outer part, the inner part having two intersecting sockets arranged transversely of each other, and a locking pin in one of the sockets and projecting outwardly therefrom laterally of the lever, the outer part of the lever extending into the other of said sockets and having a portion for shifting the pin.

12. A lever for a machine tool comprising an inner part and an outer part, the inner part having two intersecting sockets arranged transversely to each other, the outer part of the lever extending into one of the sockets and a locking pin extending into the other socket and having an operative portion projecting laterally from the lever, the outer part of the lever and the locking pin having interfitting portions.

13. A lever for a machine tool comprising an inner part and an outer part, the inner part having two intersecting sockets arranged transversely to each other, the outer part of the lever extending into one of the sockets and a locking pin extending into the other socket, the locking pin and a portion of the outer part of the lever having engaging notched portions.

14. A lever for a machine tool comprising an inner part having an axially disposed socket and outer part fitted into said socket and rotatable therein, the part fitting into the socket having a notched portion, an adjustable abutment carried by the inner part of the lever and engaging the notched portion and serving to limit the movement of the outer part of the lever in one direction, and a locking pin carried by the inner part of the lever and adapted to be shifted by the rotary movement of the outer part of the lever.

15. A lever for a machine tool comprising an inner part having an axially disposed socket, an outer handle part rotatably fitted in said socket, a second socket in the inner part of the lever intersecting the first-named, a locking pin in said second socket, said locking pin and the socketed portion of the outer part of the lever being arranged so that the rotary movement of said outer part of the lever in the first-named socket may shift the locking pin in endwise direction, and an adjustable set screw forming an abutment to limit the rotary movement of the outer part of the lever in one direction relative to the inner part.

In testimony whereof we hereunto affix our signatures.

EDWARD P. BURRELL.
GEORGE W. DRAKE.